US012790519B2

(12) United States Patent
Kusumoto et al.

(10) Patent No.: US 12,790,519 B2
(45) Date of Patent: Nov. 10, 2026

(54) LAMINATE

(71) Applicant: MITSUI CHEMICALS, INC., Tokyo (JP)

(72) Inventors: Masaya Kusumoto, Sodegaura (JP); Shoma Nakahara, Ichihara (JP); Takuya Tamura, Sodegaura (JP)

(73) Assignee: MITSUI CHEMICALS, INC., Tokyo (JP)

( * ) Notice: Subject to any disclaimer, the term of this patent is extended or adjusted under 35 U.S.C. 154(b) by 533 days.

(21) Appl. No.: 17/928,482

(22) PCT Filed: Jul. 13, 2021

(86) PCT No.: PCT/JP2021/026282
§ 371 (c)(1),
(2) Date: Nov. 29, 2022

(87) PCT Pub. No.: WO2022/014588
PCT Pub. Date: Jan. 20, 2022

(65) Prior Publication Data

US 2023/0203350 A1 Jun. 29, 2023

(30) Foreign Application Priority Data

Jul. 14, 2020 (JP) ................................ 2020-120500

(51) Int. Cl.
*C09J 7/38* (2018.01)
*C08L 23/0869* (2025.01)
*C09J 7/21* (2018.01)
*C09J 7/28* (2018.01)

(52) U.S. Cl.
CPC ........... *C09J 7/381* (2018.01); *C08L 23/0869* (2013.01); *C09J 7/21* (2018.01); *C09J 7/28* (2018.01); *C09J 2301/414* (2020.08); *C09J 2400/163* (2013.01); *C09J 2400/283* (2013.01); *C09J 2423/04* (2013.01)

(58) Field of Classification Search
CPC ........ C09J 7/381; C09J 7/21; C09J 2301/414; C09J 2400/283; C09J 2423/04; C08L 23/0869
USPC .......................................................... 524/501
See application file for complete search history.

(56) References Cited

U.S. PATENT DOCUMENTS

| | | | |
|---|---|---|---|
| 4,410,655 A | 10/1983 | Funakoshi et al. |
| 8,716,405 B2 | 5/2014 | Nakano et al. |
| 9,120,920 B2 | 9/2015 | Nakano et al. |
| 2011/0071259 A1 | 3/2011 | Nakano et al. |
| 2013/0079457 A1 | 3/2013 | Nakano et al. |

FOREIGN PATENT DOCUMENTS

| | | |
|---|---|---|
| JP | 57137339 A | 8/1982 |
| JP | 2001206953 A | 7/2001 |
| JP | 2012214571 A | 11/2012 |
| WO | 2009/145235 A1 | 12/2009 |
| WO | 2011/152324 A1 | 12/2011 |

*Primary Examiner* — Ruiyun Zhang

(74) *Attorney, Agent, or Firm* — RANKIN, HILL & CLARK LLP

(57) ABSTRACT

The present invention provides a laminate having an adhesive layer excellent in low-temperature adhesiveness, water resistance, and hot water resistance. The laminate includes: a substrate; and an adhesive layer laminated on at least one surface of the substrate, in which the adhesive layer is obtained by drying a coated product of an aqueous dispersion containing water and a resin (X), and the resin (X) contains two or more kinds of ethylene-unsaturated carboxylic acid copolymers (a) each having a different content of a structural unit derived from an unsaturated carboxylic acid.

3 Claims, No Drawings

LAMINATE

TECHNICAL FIELD

The present invention relates to a laminate.

BACKGROUND ART

Techniques for bonding a substrate such as a plastic film, a vapor deposition film, a metal foil, paper, or a nonwoven fabric to another adherend or bonding substrates to each other by heat or pressure (that is, performing heat sealing) have been widely used in various industrial fields. In this heat-sealing technique, usually, an adhesive layer capable of being bonded by heat and pressure is provided on a substrate in advance, and the substrate and another adherend or the substrates are bonded to each other with the adhesive layer interposed therebetween.

For example, in JP S57-137339 A, heat sealing is performed through an adhesive layer formed by applying an aqueous dispersion composition of a modified product of ethylene, α,β-unsaturated carboxylic acid, and an α,β-unsaturated metal carboxylate copolymer.

CITATION LIST

Patent Literature

Patent Literature 1: JP S57-137339 A

SUMMARY OF INVENTION

Technical Problem

Depending on, for example, the type and use application of the substrate and the adherend, further improvement in low-temperature adhesiveness, water resistance, and hot water resistance may be required.

An object of the present invention is to provide a laminate having an adhesive layer excellent in low-temperature adhesiveness, water resistance, and hot water resistance.

Solution to Problem

The present invention includes the following inventions [1] to [6].

[1] A laminate including:

a substrate; and an adhesive layer laminated on at least one surface of the substrate, in which the adhesive layer is obtained by drying a coated product of an aqueous dispersion containing water and a resin (X), and the resin (X) contains two or more kinds of ethylene-unsaturated carboxylic acid copolymers (a) each having a different content of a structural unit derived from an unsaturated carboxylic acid.

[2] The laminate described in [1], in which the total content of the structural units derived from an unsaturated carboxylic acid included in the two or more kinds of ethylene-unsaturated carboxylic acid copolymers (a) is 5 mass % or more and less than 18 mass % based on the total amount of structural units derived from monomers of the polymer contained in the resin (X).

[3] The laminate described in [1] or [2], in which the two or more kinds of ethylene-unsaturated carboxylic acid copolymers (a) include one or more kinds of each of an ethylene-unsaturated carboxylic acid copolymer (a1) having a content of a structural unit derived from an unsaturated carboxylic acid of 12 mass % or more and 30 mass % or less, and an ethylene-unsaturated carboxylic acid copolymer (a2) having a content of a structural unit derived from an unsaturated carboxylic acid of more than 0 mass % and less than 12 mass %.

[4] The laminate described in [3], in which the two or more kinds of ethylene-unsaturated carboxylic acid copolymers (a) satisfy at least one of the following conditions (i) and (ii):

(i) including two or more kinds of ethylene-unsaturated carboxylic acid copolymers each having a different content of a structural unit derived from an unsaturated carboxylic acid as the ethylene-unsaturated carboxylic acid copolymer (a1); and (ii) including two or more kinds of ethylene-unsaturated carboxylic acid copolymers each having a different content of a structural unit derived from an unsaturated carboxylic acid as the ethylene-unsaturated carboxylic acid copolymer (a2).

[5] The laminate described in [4], in which as the ethylene-unsaturated carboxylic acid copolymer (a1), an ethylene-unsaturated carboxylic acid copolymer (a1-1) having a content of a structural unit derived from an unsaturated carboxylic acid of 17 mass % or more and 30 mass % or less, and an ethylene-unsaturated carboxylic acid copolymer (a1-2) having a content of a structural unit derived from an unsaturated carboxylic acid of 12 mass % or more and less than 17 mass % are included.

[6] A laminate including:

a substrate; and an adhesive layer laminated on at least one surface of the substrate, in which the adhesive layer contains two or more kinds of ethylene-unsaturated carboxylic acid copolymers (a) each having a different content of a structural unit derived from an unsaturated carboxylic acid.

ADVANTAGEOUS EFFECTS OF INVENTION

According to the present invention, it is possible to obtain a laminate having excellent low-temperature adhesiveness, water resistance, and hot water resistance.

Description of Embodiments

In the present specification, a numerical range expressed by using "to" means a range including numerical values described before and after "to" as a lower limit value and an upper limit value.

In the numerical ranges stated hierarchically in the present specification, the upper limit value or the lower limit value described in a numerical range of a certain hierarchical level may be replaced with the upper limit value or the lower limit value of a numerical range of another hierarchical level.

A laminate of the present invention will be described in detail below.

The laminate of the present invention includes: a substrate; and an adhesive layer laminated on at least one surface of the substrate, in which the adhesive layer contains two or more kinds of ethylene-unsaturated carboxylic acid copolymers (a) each having a different content of a structural unit derived from an unsaturated carboxylic acid.

An embodiment of such a laminate of the present invention is a laminate including: a substrate; and an adhesive layer laminated on at least one surface of the substrate, in which the adhesive layer is obtained by drying a coated product of an aqueous dispersion containing water and a resin (X), and the resin (X) contains two or more kinds of ethylene-unsaturated carboxylic acid copolymers (a) each having a different content of a structural unit derived from an unsaturated carboxylic acid.

<Aqueous Dispersion>

The aqueous dispersion used in the production of the laminate of the present invention contains a resin (X) and water in which the resin (X) is dispersed.

[Resin (X)]

The resin (X) contains two or more kinds of ethylene-unsaturated carboxylic acid copolymers (a) each having a different content of a structural unit derived from an unsaturated carboxylic acid.

The total content (acid content) of the structural units derived from an unsaturated carboxylic acid included in the ethylene-unsaturated carboxylic acid copolymers (a) is preferably 5 mass % or more and more preferably 8 mass % or more, and is preferably less than 18 mass % and more preferably less than 16 mass %, based on the total amount of structural units derived from monomers of the polymer contained in the resin (X). When the total content (acid content) of the structural units derived from an unsaturated carboxylic acid is within the above range, a laminate to be obtained may have excellent low-temperature adhesiveness, water resistance, and hot water resistance.

The total content of structural units derived from ethylene included in the ethylene-unsaturated carboxylic acid copolymers (a) is preferably 82 mass % or more and more preferably 84 mass % or more, and is preferably less than 95 mass % and more preferably 92 mass % or less, based on the total amount of structural units derived from monomers of the polymer contained in the resin (X). When the total content of the structural units derived from ethylene is within the above range, a laminate to be obtained may have excellent low-temperature adhesiveness, water resistance, and hot water resistance.

The weight average molecular weight of the resin (X) is, for example, 8,000 or more and preferably 10,000 or more, and is, for example, 150,000 or less and preferably 100,000 or less. In the present invention, the weight average molecular weight is a value determined in terms of standard polystyrene by gel permeation chromatography (GPC) measurement.

The melting point of the resin (X) is, for example, 80° C. or higher and preferably 85° C. or higher, and is, for example, 97° C. or lower and preferably 92° C. or lower.

The melt flow rate (MFR ASTM D1238, 190° C., 2.16 kg load) of the resin (X) is preferably 0.1 g/10 min or more and more preferably 0.5 g/10 min or more, and is preferably 150 g/10 min or less and more preferably 100 g/10 min or less.

The method for producing the resin (X) containing two or more kinds of ethylene-unsaturated carboxylic acid copolymers (a) each having a different content of a structural unit derived from an unsaturated carboxylic acid is not particularly limited. For example, the resin (X) can be produced by melt-kneading two or more kinds of ethylene-unsaturated carboxylic acid copolymers at a temperature equal to or higher than the melting point of an ethylene-unsaturated carboxylic acid copolymer (a) having the highest melting point among two or more kinds of ethylene-unsaturated carboxylic acid copolymers (a), preferably 100° C. or higher, and more preferably 110° C. or higher.

In the case of using two or more kinds of ethylene-unsaturated carboxylic acid copolymers obtained by neutralizing a part or all of the carboxy groups contained in the copolymers as the two or more kinds of ethylene-unsaturated carboxylic acid copolymers (a), for example, as described above, the resin (X) can be produced by melt-kneading inorganic base neutralized products of the two or more kinds of ethylene-unsaturated carboxylic acid copolymers. As another method, two or more kinds of ethylene-unsaturated carboxylic acid copolymers in which a part or all of carboxy groups are neutralized can be produced by melt-kneading two or more kinds of ethylene-unsaturated carboxylic acid copolymers to prepare a melt-kneaded product, putting the obtained melt-kneaded product into an aqueous solution containing a neutralizing agent and water, which is maintained at preferably a temperature equal to or higher than the melting point of an ethylene-unsaturated carboxylic acid copolymer having the highest melting point among the two or more kinds of ethylene-unsaturated carboxylic acid copolymers, more preferably 100° C. or higher, and further preferably 110° C. or higher, and mixing these melt-kneaded product and aqueous solution.

As the neutralizing agent, for example, a basic compound can be used. Specific examples thereof include inorganic basic compounds such as sodium hydroxide and potassium hydroxide; and organic basic compounds represented by amines such as ammonia, triethylamine, triethanolamine, and dimethylethanolamine.

Among these basic compounds, inorganic basic compounds are preferable, and sodium hydroxide and potassium hydroxide are more preferable. These basic compounds may be used singly or in combination of two or more kinds thereof.

The amount of the basic compound added is, for example, 5 mol or more, preferably 20 mol or more, and more preferably 25 mol or more, and is, for example, 70 mol or less and preferably 60 mol or less, per 100 mol of all the carboxy groups contained in the two or more kinds of ethylene-unsaturated carboxylic acids (a).

After the neutralizing agent is added for neutralization, it is preferable to hold at a predetermined temperature for a predetermined time. As holding conditions, the retention temperature is, for example, 40° C. or higher and preferably 50° C. or higher, and is, for example, 190° C. or lower and preferably 180° C. or lower. The retention time is, for example, 30 minutes or longer and preferably 1 hour or longer, and is, for example, 12 hours or shorter and preferably 10 hours or shorter.

When the ethylene-unsaturated carboxylic acid copolymer is neutralized and used, the degree of neutralization of the two or more kinds of ethylene-unsaturated carboxylic acid copolymers (a) as a whole is, for example, 20% or more and preferably 25% or more, and is, for example, 70% or less and preferably 60% or less. The degree of neutralization described herein means mol % in which the carboxy group in the ethylene-unsaturated carboxylic acid copolymer (a) in the resin (X) is neutralized by a basic compound as a neutralizing agent.

When the degree of neutralization is in the above range, an adhesive layer excellent in heat-sealing strength is obtained from the aqueous dispersion. The degree of neutralization is calculated in accordance with Examples described below.

The resin (X) may optionally contain, in addition to water and the two or more kinds of ethylene-unsaturated carboxylic acid copolymers (a), for example, low-density polyethylene, an ethylene-butene copolymer, an ethylene-propylene copolymer, an ethylene-1-butene-propylene copolymer, an ethylene-propylene-ethylidene norbornene copolymer, an ethylene-(meth)acrylic acid ester copolymer, an ethylene-vinyl acetate copolymer, and an ethylene-vinyl acetate-carbon monoxide copolymer.

[Two or More Kinds of Ethylene-Unsaturated Carboxylic Acid Copolymers (a)]

Each of the ethylene-unsaturated carboxylic acid copolymers contained as the two or more kinds of ethylene-unsaturated carboxylic acid copolymers (a) is a copolymer including a structural unit derived from ethylene and a structural unit derived from an unsaturated carboxylic acid.

The two or more kinds of ethylene-unsaturated carboxylic acid copolymers (a) preferably include an ethylene-unsaturated carboxylic acid copolymer (a1) that is a copolymer having a large carboxy group content and has a content of a structural unit derived from an unsaturated carboxylic acid of 12 mass % or more and 30 mass % or less, and an ethylene-unsaturated carboxylic acid copolymer (a2) that is a copolymer having a small carboxy group content and has a content of a structural unit derived from an unsaturated carboxylic acid of more than 0 mass % and less than 12 mass %.

The content of the structural unit derived from the unsaturated carboxylic acid in the ethylene-unsaturated carboxylic acid copolymer (a1) is preferably 15 mass % or more and preferably 25 mass % or less, from the viewpoint of emulsion stability.

The weight average molecular weight of the ethylene-unsaturated carboxylic acid copolymer (a1) is, for example, 8,000 or more and preferably 10,000 or more, and is, for example, 150,000 or less and preferably 100,000 or less, from the viewpoint of adhesion strength and emulsion stability.

The melting point of the ethylene-unsaturated carboxylic acid copolymer (a1) is, for example, 70° C. or higher and preferably 80° C. or higher, and is, for example, 100° C. or lower and preferably 95° C. or lower, from the viewpoint of heat sealability.

The melt flow rate (MFR ASTM D1238, 190° C., 2.16 kg load) of the ethylene-unsaturated carboxylic acid copolymer (a1) is, for example, 0.1 g/10 min or more and preferably 0.5 g/10 min or more, and is, for example, 150 g/10 min or less and preferably 100 g/10 min or less, from the viewpoint of adhesion strength and emulsion stability.

The content of the structural unit derived from the unsaturated carboxylic acid in the ethylene-unsaturated carboxylic acid copolymer (a2) is preferably 2 mass % or more and preferably 10 mass % or less, from the viewpoint of emulsion stability.

The weight average molecular weight of the ethylene-unsaturated carboxylic acid copolymer (a2) is, for example, 8,000 or more and preferably 10,000 or more, and is, for example, 150,000 or less and preferably 100,000 or less, from the viewpoint of adhesion strength and emulsion stability.

The melting point of the ethylene-unsaturated carboxylic acid copolymer (a2) is, for example, 70° C. or higher and preferably 80° C. or higher, and is, for example, 100° C. or lower and preferably 95° C. or lower, from the viewpoint of heat sealability.

The melt flow rate (MFR ASTM D1238, 190° C., 2.16 kg load) of the ethylene-unsaturated carboxylic acid copolymer (a2) is, for example, 0.1 g/10 min or more and preferably 0.5 g/10 min or more, and is, for example, 150 g/10 min or less and preferably 100 g/10 min or less, from the viewpoint of adhesion strength and emulsion stability.

From the viewpoint of low-temperature adhesiveness, water resistance, and hot water resistance, the two or more kinds of ethylene-unsaturated carboxylic acid copolymers (a) preferably satisfy at least one of the following conditions (i) and (ii):

(i) including two or more kinds of ethylene-unsaturated carboxylic acid copolymers each having a different content of a structural unit derived from an unsaturated carboxylic acid as the ethylene-unsaturated carboxylic acid copolymer (a1); and (ii) including two or more kinds of ethylene-unsaturated carboxylic acid copolymers each having a different content of a structural unit derived from an unsaturated carboxylic acid as the ethylene-unsaturated carboxylic acid copolymer (a2).

In the condition (i), as the ethylene-unsaturated carboxylic acid copolymer (a1), an ethylene-unsaturated carboxylic acid copolymer (a1-1) having a content of a structural unit derived from an unsaturated carboxylic acid of 17 mass % or more and 30 mass % or less, and an ethylene-unsaturated carboxylic acid copolymer (a1-2) having a content of a structural unit derived from an unsaturated carboxylic acid of 12 mass % or more and less than 17 mass % are preferably included.

The content of the structural unit derived from the unsaturated carboxylic acid in the ethylene-unsaturated carboxylic acid copolymer (a1-1) is preferably 18 mass % or more and preferably 25 mass % or less, from the viewpoint of emulsion stability.

The weight average molecular weight of the ethylene-unsaturated carboxylic acid copolymer (a1-1) is, for example, 8,000 or more and preferably 10,000, and is, for example, 150,000 or less and preferably 100,000 or less, from the viewpoint of adhesion strength and emulsion stability.

The melting point of the ethylene-unsaturated carboxylic acid copolymer (a1-1) is, for example, 70° C. or higher and preferably 80° C. or higher, and is, for example, 100° C. or lower and preferably 95° C. or lower, from the viewpoint of heat sealability.

The melt flow rate (MFR ASTM D1238, 190° C., 2.16 kg load) of the ethylene-unsaturated carboxylic acid copolymer (a1-1) is, for example, 0.1 g/10 min or more and preferably 0.5 g/10 min or more, and is, for example, 150 g/10 min or less and preferably 100 g/10 min or less, from the viewpoint of adhesion strength and emulsion stability.

The content of the structural unit derived from the unsaturated carboxylic acid in the ethylene-unsaturated carboxylic acid copolymer (a1-2) is preferably 12 mass % or more and preferably 15 mass % or less, from the viewpoint of emulsion stability.

The weight average molecular weight of the ethylene-unsaturated carboxylic acid copolymer (a1-2) is, for example, 8,000 or more and preferably 10,000, and is, for example, 150,000 or less and preferably 100,000 or less, from the viewpoint of adhesion strength and emulsion stability.

The melting point of the ethylene-unsaturated carboxylic acid copolymer (a1-2) is, for example, 70° C. or higher and preferably 80° C. or higher, and is, for example, 100° C. or lower and preferably 95° C. or lower, from the viewpoint of heat sealability.

The melt flow rate (MFR ASTM D1238, 190° C., 2.16 kg load) of the ethylene-unsaturated carboxylic acid copolymer (a1-2) is, for example, 0.1 g/10 min or more and preferably 0.5 g/10 min or more, and is, for example, 150 g/10 min or less and preferably 100 g/10 min or less, from the viewpoint of adhesion strength and emulsion stability.

When the ethylene-unsaturated carboxylic acid copolymer (a1-1), the ethylene-unsaturated carboxylic acid copolymer (a1-2), and the ethylene-unsaturated carboxylic acid copolymer (a2) described above are used as the ethylene-unsaturated carboxylic acid copolymers (a), the content of the ethylene-unsaturated carboxylic acid copolymer (a2) is preferably 20 mass % or more and more preferably 25 mass % or more, and is preferably 85 mass % or less and more preferably 80 mass % or less, based on the total amount of the ethylene-unsaturated carboxylic acid copolymers (a) contained in the resin (X). The content of the ethylene-unsaturated carboxylic acid copolymer (a1-1) is preferably 20 mass % or more and more preferably 25 mass % or more, and is preferably 80 mass % or less and more preferably 75 mass % or less, based on the total amount of the ethylene-unsaturated carboxylic acid copolymers (a) contained in the resin (X). The content of the ethylene-unsaturated carboxylic acid copolymer (a1-2) is preferably 10 mass % or more and more preferably 15 mass % or more, and is preferably 80 mass % or less and more preferably 75 mass % or less, based on the total amount of the ethylene-unsaturated carboxylic acid copolymers (a) contained in the resin (X). However, the total content of the ethylene-unsaturated carboxylic acid copolymer (a1-1), the ethylene-unsaturated carboxylic acid copolymer (a1-2), and the ethylene-unsaturated carboxylic acid copolymer (a2) is 100 mass %.

Each of the ethylene-unsaturated carboxylic acid copolymers included in the two or more kinds of ethylene-unsaturated carboxylic acid copolymers (a) is obtained by polymerizing monomer components containing ethylene and an unsaturated carboxylic acid according to the content of a constituent unit derived from a desired unsaturated carboxylic acid.

The unsaturated carboxylic acid is a monomer having at least one ethylenically unsaturated bond and a carboxy group. Examples of the unsaturated carboxylic acid include monobasic acids having an ethylenically unsaturated bond such as acrylic acid, methacrylic acid, and crotonic acid; and dibasic acids having an ethylenically unsaturated bond such as maleic acid, fumaric acid, and itaconic acid. Among the unsaturated carboxylic acids, from the viewpoint of water resistance, monobasic acids having an ethylenically unsaturated bond are preferable, and acrylic acid and methacrylic acid are more preferable. These unsaturated carboxylic acids may be used singly or in combination of two or more kinds thereof.

The content ratio of ethylene in the monomer component may be appropriately set according to the content of a constituent unit derived from ethylene of an ethylene-unsaturated carboxylic acid copolymer to be obtained. Similarly, the content ratio of an unsaturated carboxylic acid in the monomer component may be appropriately set according to the content of a constituent unit derived from the unsaturated carboxylic acid of the ethylene-unsaturated carboxylic acid copolymer.

The method for polymerizing the monomer component is not particularly limited as long as a desired ethylene-unsaturated carboxylic acid copolymer is obtained, and examples of the polymerization method therefor include known polymerization methods. The ethylene-unsaturated carboxylic acid copolymer is obtained, for example, by bringing a monomer component into contact with a polymerization initiator such as a peroxide under high temperature and high pressure conditions and polymerizing the monomer component.

The ethylene-unsaturated carboxylic acid copolymer can be obtained as a dispersion (aqueous dispersion) in which particles thereof are dispersed in water. In such a case, the ethylene-unsaturated carboxylic acid copolymer can be obtained as a dispersion (aqueous dispersion) by the methods described, for example, in JP H7-008933 B, JP H5-039975 B, JP H4-030970 B, JP S42-000275 B, JP S42-023085 B, JP S45-029909 B, JP S51-062890 A, and JP 4746337 B2. The ethylene-unsaturated carboxylic acid copolymer has self-emulsifying properties.

[Production of Aqueous Dispersion]

The aqueous dispersion can be obtained, for example, as a dispersion (aqueous dispersion) in which the resin particles of the resin (X) containing two or more kinds of ethylene-unsaturated carboxylic acid copolymers (a) are dispersed in water as described above. Specifically, the aqueous dispersion can be produced by dispersing and stirring a resin component containing two or more kinds of ethylene-unsaturated carboxylic acid copolymers in water or an aqueous alkali solution maintained at preferably 100° C. or higher, more preferably 110° C. or higher.

The aqueous dispersion obtained as described above may contain an additive in addition to the resin (X). Examples of the additives include the above-described emulsifier, a curing agent, a crosslinking agent, a film formation aid, an antifoaming agent, an anti-repelling agent, a leveling agent, a tackifier, a hardness imparting agent, an antiseptic, a thickener, an anti-freezing agent, a dispersant, an inorganic pigment, and an organic pigment. These additives may be used singly or in combination of two or more kinds thereof. The amount of these additives added, and, for example, the time of addition thereof are appropriately set according to the purpose and use application.

[Physical Properties]

The melt flow rate (MFR ASTM D1238, 190° C., 2.16 kg load) of the resin (X) is preferably 0.1 g/10 min or more and more preferably 0.5 g/10 min or more, and is preferably 150 g/10 min or less and more preferably 100 g/10 min or less.

The weight average particle diameter (measuring method: light scattering measurement) of the resin particles of the resin (X) dispersed in the aqueous dispersion is preferably 0.01 μm or more and more preferably 0.02 μm or more, and is preferably 4.0 μm or less and more preferably 1.0 μm or less.

The viscosity (measuring method: B-type viscometer) of the aqueous dispersion at 25° C. is preferably 10 mPa·s or more and more preferably 50 mPa·s or more, and is preferably 900 mPa·s or less and more preferably 500 mPa·s or less, from the viewpoint of coating suitability.

The nonvolatile content (solid content concentration) of the aqueous dispersion is preferably 20 mass % or more and more preferably 25 mass % or more, and is preferably 60 mass % or less and more preferably 55 mass % or less. The nonvolatile content of the aqueous dispersion is a ratio of a component containing a resin component remaining when water in the aqueous dispersion is removed, for example, by heating to the aqueous dispersion.

The aqueous dispersion can be suitably used for forming an adhesive layer (heat seal layer) of a laminate. The laminate having such an adhesive layer is excellent in low-temperature adhesiveness, water resistance, and hot water resistance.

<Laminate>

The laminate of the present invention has a substrate and an adhesive layer that can be prepared from the above-described aqueous dispersion on at least one surface of the substrate. This adhesive layer contains, as described above, two or more kinds of ethylene-unsaturated carboxylic acid copolymers (a) each having a different content of a structural unit derived from an unsaturated carboxylic acid. The adhesive layer may be present on one side or both sides of the substrate. The adhesive layer may be present on the entire surface or a part of the substrate.

[Substrate]

Examples of the substrate include cellophane; plastic films made of plastic materials such as polyethylene, an ethylene-vinyl acetate copolymer, an ionomer, polypropylene, polyamide (nylon), polyester, polyvinyl chloride, polyvinylidene chloride, polyvinyl alcohol, an ethylene-vinyl alcohol copolymer, polycarbonate, polystyrene, a polyacrylonitrile copolymer, and a mixture thereof; vapor deposition films in which vapor-deposited products of metals such as aluminum, gold, silver, copper, nickel, zinc, titanium, cobalt, indium, and chromium, or inorganic oxides such as aluminum oxide and silicon oxide are vapor-deposited on these plastic films; metal foils such as aluminum foils, paper, and nonwoven fabrics.

The paper that may be the substrate of the laminate is not particularly limited, and known paper containing pulp as a main component can be used. Examples of pulp as a main component of paper include chemical pulp such as leaf bleached kraft pulp (LBKP) and needle bleached kraft pulp (NBKP); mechanical pulp such as ground pulp (GP), pressure groundwood (PGW), refiner mechanical pulp (RMP), thermomechanical pulp (TMP), chemi-thermomechanical pulp (CTMP), chemi-mechanical pulp (CMP), and chemi-ground pulp (CGP); wood pulp such as deinked pulp (DIP); and nonwood pulp such as kenaf, bagasse, bamboo, and cotton. The density of these paper substrates is preferably 0.5 $g/m^3$ or more and more preferably 0.7 $g/m^3$ or more.

These may be used singly or in combination of two or more kinds thereof. For example, as the pulp, pulp containing 90 to 100 mass % of leaf bleached kraft pulp (LBKP) can be used.

The pulp may contain synthetic fibers as long as the effects of the present invention are not impaired.

From the viewpoint of environmental conservation, among pulps, elemental chlorine free (ECF) pulp, total chlorine free (TCF) pulp, waste paper pulp, and pulp obtained from tree plantation are preferable.

The freeness of the pulp is, for example, 200 to 700 ml CSF and preferably 450 to 620 ml CSF based on Canadian standard freeness (freeness) (JIS P 8121:1995 "Pulps-Determination of drainability").

As paper serving as a substrate, paper containing a filler can also be used. Examples of the filler include light calcium carbonate, heavy calcium carbonate, talc, clay, kaolin, calcined clay, titanium dioxide, and aluminum hydroxide. The content of the filler in the paper is, for example, 1 to 30 parts by mass per 100 parts by mass of the dry mass of the pulp. When light calcium carbonate is contained as a filler, light calcium carbonate may be contained in an amount of, for example, 1 to 10 parts by mass per 100 parts by mass of the dry mass of the pulp.

The paper may contain various known additives for papermaking in addition to pulp. Examples of the additives for papermaking include internal paper strength enhancers such as a sizing agent and a wet paper strength enhancer; bulking agents, yield improvers, water-filterability improvers, coloring dyes, coloring pigments, fluorescent brighteners, fluorescent decoloring agents, and pitch control agents. The paper serving as a substrate may be paper coated with a water-soluble polymer such as starch, polyvinyl alcohol, or polyacrylamide.

The method for making paper serving as a substrate is not particularly limited, and for example, paper can be produced by paper machines such as a Fourdrinier paper machine, a Fourdrinier multilayer paper machine, a cylinder paper machine, a cylindrical multilayer paper machine, a Fourdrinier-cylindrical combined multilayer paper machine, and a twin-wire paper machine. The paper used in the laminate of the present invention may be single layer paper or multilayer paper, or may be an adhered product of a plurality of layers.

Among these substrates, a metal foil such as an aluminum foil, paper, a nonwoven fabric, a plastic film, and a vapor deposition film are preferable, and a metal foil such as an aluminum foil and paper are more preferable, from the viewpoint of more excellent heat sealability of the adhesive layer included in the laminate.

These substrates may be used singly or in combination of two or more kinds thereof.

The substrate may be subjected to a pretreatment such as a primer (such as titanate or polyethyleneimine) treatment, a corona discharge treatment, or a chemical conversion treatment for the purpose of, for example, improving adhesion to the adhesive layer.

The substrate may be provided with one or more layers different from the adhesive layer. For example, when paper is used as the substrate, one or more coating layers may be provided. Examples of such a coating layer include a pigment coating layer obtained from a coating liquid containing a pigment and an adhesive.

As the pigment contained in the pigment coating layer, a known pigment used in a coating layer of general printing coating paper can be used, and examples thereof include inorganic pigments such as calcium carbonate (such as heavy calcium carbonate and light calcium carbonate), kaolin (including clay), calcined clay, talc, magnesium carbonate, barium sulfate, calcium sulfate, titanium dioxide, zinc oxide, zinc sulfate, zinc carbonate, calcium silicate, aluminum silicate, magnesium silicate, diatomaceous earth, aluminum hydroxide, and magnesium hydroxide; and organic pigments (so-called plastic pigments) such as an acrylic resin, a styrene-based resin, a vinyl chloride-based resin, nylon, and a resin obtained by copolymerizing monomers constituting these resins.

As the pigment used for the pigment coating layer, for example, a combination of 20 to 40 parts by mass of kaolin and 60 to 80 parts by mass of heavy calcium carbonate can be used.

As the adhesive used for the pigment coating layer, a known adhesive used for a coating layer of general printing coated paper can be used, and examples thereof include starches such as butadiene-based copolymer latex, cross-linking-agent-modified starch, oxidized starch, enzyme-modified starch, esterified starch, etherified starch, cationic starch, and amphoteric starch; water-soluble polymers such as gelatin, casein, soybean protein, and polyvinyl alcohol; and synthetic resins of vinyl acetate, ethylene vinyl acetate, a polyurethane-based resin, an acrylic resin, a polyester-based resin, and a polyamide-based resin.

The blending ratio of the pigment and the adhesive in the pigment coating layer is not particularly limited, and is preferably 5 to 50 parts by mass of the adhesive per 100 parts by mass of the pigment. For example, an adhesive combination of 1 to 5 parts by mass of phosphate esterified starch and 5 to 15 parts by mass of styrene butadiene latex can be used per 100 parts by mass of the pigment.

The pigment coating layer may contain various auxiliaries as long as the effects of the present invention are not impaired, and for example, a viscosity modifier, a softener, a gloss imparting agent, a water-resistant agent, a dispersant, a flow modifier, an ultraviolet absorber, a stabilizer, an antistatic agent, a crosslinking agent, a sizing agent, a fluorescent brightener, a colorant, a pH adjuster, an anti-foaming agent, a plasticizer, and an antiseptic agent may be contained.

The amount of the coating liquid to be coated for producing such a pigment coating layer is, for example, 2 to 40 g/m$^2$ in terms of nonvolatile content (in terms of solid content) per one side of the base paper.

[Adhesive Layer]

The adhesive layer included in the laminate of the present invention is obtained, for example, by applying (coating) an aqueous dispersion containing the resin (X) to at least one surface of the substrate, drying a layer formed of the coated product, and removing volatile components such as water contained in at least a part of the aqueous dispersion.

The method for applying (coating) the aqueous dispersion obtained in the present invention is not particularly limited, and examples thereof include a die coating method, a flow coating method, a spray coating method, a bar coating method, a gravure coating method, a gravure reverse coating method, a kiss reverse coating method, a microgravure coating method, a roll coating method, a blade coating method, a rod coating method, a roll doctor coating method, an air knife coating method, a comma roll coating method, a reverse roll coating method, a transfer roll coating method, a kiss roll coating method, a curtain coating method, and a printing method.

The drying conditions of the layer formed of the coated product of the aqueous dispersion are not particularly limited as long as volatile components such as moisture derived from the aqueous dispersion can be removed, and the drying temperature is, for example, 100 to 200° C. and the drying time is, for example, 10 seconds to 30 minutes.

The amount of the adhesive layer to be coated may be appropriately set according to, for example, a desired use application, and is preferably 1.5 g/m$^2$ or more and more preferably 2.0 g/m$^2$ or more, and is preferably 13 g/m$^2$ or less and preferably 10 g/m$^2$ or less.

The ratio of the resin (X) in the adhesive layer may be appropriately set according to, for example, a desired use application, and is preferably 50 mass % or more and more preferably 80 mass % or more.

With respect to the water resistance of the adhesive layer, $Cobb_{300}$ (Cobb method: contact time of JIS P8140: 300 seconds) is preferably 15 g/m$^2$ or less and more preferably 10 g/m$^2$ or less.

The adhesive layer is excellent in heat sealability at a low temperature. The adhesive layer is prepared from the aqueous dispersion having the resin particles. When the adhesive layer is prepared from such an aqueous dispersion, the amount of the organic solvent remaining in the adhesive layer is small, and the amount of the organic solvent remaining in the adhesive layer can be preferably 100 ppm or less and more preferably 10 ppm or less.

[Use Application]

The laminate obtained in the present invention is suitably used as a material for heat sealing in various industrial fields. By performing heat sealing, the substrate included in the laminate of the present invention and an adherend layer are bonded to each other with the adhesive layer interposed therebetween. The adherend layer may be included in the laminate of the present invention, or may be a layer included in an article different from the laminate of the present invention.

Examples of the adherend layer include the same materials as the substrate included in the laminate. As the adherend layer, a metal foil such as an aluminum foil, paper, a nonwoven fabric, a plastic film, and a vapor deposition film are preferable, and a metal foil such as an aluminum foil and paper are more preferable. These adherend layers may be used singly or in combination of two or more kinds thereof.

The laminate of the present invention may include the adherend layer in addition to the substrate and the adhesive layer. In this case, the substrate and, for example, the adherend layer may be bonded to each other with the adhesive layer interposed therebetween. In the case of being bonded, in the laminate of the present invention, the adherend layer is laminated on the surface of the adhesive layer opposite to the surface in contact with the substrate.

The method for heat-sealing the substrate and the adherend layer is not particularly limited. For example, the substrate and the adherend layer included in the laminate are superimposed with the adhesive layer interposed therebetween, and then the laminate is heated and pressurized, whereby heat sealing can be performed.

When the adherend layer further includes an adhesive layer, the adhesive layer included in the laminate of the present invention and the adhesive layer of the adherend layer are superimposed on each other, and then the laminate is heated and pressurized, whereby heat sealing may be performed.

The heating temperature at the time of heat sealing is, for example, 80° C. or higher and preferably 100° C. or higher, and is, for example, 250° C. or lower and preferably 200° C. or lower. The pressure at the time of heat sealing is, for example, 50 kPa or more and preferably 100 kPa or more, and is, for example, 500 kPa or less and preferably 300 kPa or less.

The adhesion strength between the substrate and the adherend layer included in the laminate of the present invention can be evaluated by the peeling strength between the substrate and the adherend layer. The peeling strength between the substrate and the adherend layer which are peeled off at a tensile speed of 50 mm/min and 180 degrees after thermocompression bonding for 0.1 seconds under the conditions of a heating temperature of 110° C. and a pressure of 1 kg/cm$^2$ is preferably 400 g/15 mm or more and more preferably 500 g/15 mm or more.

The laminate in which the adherend layer is laminated on at least one surface of the adhesive layer included in the laminate in this manner (in other words, the laminate in which the adherend layer is laminated on at least one surface of the adhesive layer included in the laminate) is included in the laminate of the present invention regardless of the heat-sealed state (that is, before and after heat sealing).

The laminate obtained in the present invention has excellent low-temperature adhesiveness, water resistance, and hot water resistance. Since an aqueous dispersion is used for forming the adhesive layer and a dispersion in which resin particles are dispersed in an organic solvent such as ethyl acetate and toluene is not used, the amount of the remaining organic solvent can be suppressed to an extremely small amount. Therefore, the laminate can be suitably used as a packaging material in various industrial fields. For example, the laminate can be suitably used as a packaging material for various industrial products, for example, foods such as confectionery, tea leaves, and spices; fragrances such as cigarettes and scents; and pharmaceuticals and paper.

EXAMPLES

Hereinafter, the present invention will be described in more detail on the basis of Examples; however, the present invention is not limited to these Examples.

Production Example 1

A resin obtained by melt-kneading 50 parts by mass of an ethylene-methacrylic acid copolymer (resin B) having a content of methacrylic acid of 15 mass % and 50 parts by mass of an ethylene-methacrylic acid copolymer (resin C) having a content of methacrylic acid of 10 mass %, 4.4 parts by mass of sodium hydroxide, and 190 parts by mass of deionized water were placed in a reaction vessel, stirred, heated to 150° C., held for 4 hours, and then cooled to room temperature to obtain an aqueous dispersion 1 of resin particles 1 of a resin 1. The average value of the contents (acid content average value) of the structural units derived from methacrylic acid in the resin 1 was 12.5 mass %, and the weight average particle diameter of the resin particles 1 was 0.5 μm. The viscosity of the aqueous dispersion 1 was 400 mPa·s, the nonvolatile content (Nv) was 35%, and the melt flow rate (MFR) was 3.0 g/10 min.

Production Examples 2 and 3

Aqueous dispersions 2 and 3 were obtained in the same manner as in Production Example 1, except that, instead of the resin containing the resin B and the resin C of Production Example 1, a resin having a composition in Table 1 was used and a resin having a composition in Table 2 was used. Each physical property value is shown in Table 2.

Production Example 4

A mixture of 30 parts by mass of an ethylene-acrylic acid copolymer (resin A) having a content of acrylic acid of 20.5 mass % and 70 parts by mass of an ethylene-methacrylic acid copolymer (resin E) having a content of methacrylic acid of 4 mass % was supplied at a rate of 50 g/min from a hopper of a twin screw extruder (manufactured by Ikegai Ironworks Corp, PCM-30, L/D=40), a 3.5% aqueous solution of potassium hydroxide was continuously supplied at a rate of 28 g/min from a supply port provided in a vent portion of the extruder, the resin mixture was continuously extruded at a heating temperature of 110° C., and the extruded resin mixture was cooled to 90° C. with a jacketed static mixer installed in the extruder port and further introduced into hot water at 80° C. to obtain an aqueous dispersion 4. The weight average particle diameter of the resin particles 4 was 0.9 μm. The viscosity of the aqueous dispersion 4 was 300 mPa·s, the nonvolatile content (Nv) was 37%, and the melt flow rate (MFR) was 1.0 g/10 min.

Production Examples 5 to 7 Production of Aqueous Dispersions 5 to 7

Aqueous dispersions 5 to 7 were obtained in the same manner as in Production Example 1, except that, instead of the resin containing the resin B and the resin C of Production Example 1, a resin having a composition in Table 1 was used and a resin having a composition in Table 2 was used. Each physical property value is shown in Table 2.

TABLE 1

| | Resin A | Resin B | Resin C | Resin D | Resin E |
|---|---|---|---|---|---|
| Resin | 79.5 | 85 | 90 | 80 | 96 |
| Methacrylic acid | — | 15 | 10 | 10 | 4 |
| Acrylic acid | 20.5 | — | — | — | — |
| Isobutyl acrylate | — | — | — | 10 | — |
| MFR (g/10 min, 190° C.) | 300 | 60 | 500 | 35 | 7 |

TABLE 2

| | Aqueous dispersion 1 | Aqueous dispersion 2 | Aqueous dispersion 3 | Aqueous dispersion 4 |
|---|---|---|---|---|
| Resin A | — | 40 | 40 | 30 |
| Resin B | 50 | 20 | 30 | — |
| Resin C | 50 | 40 | — | — |
| Resin D | — | — | 30 | — |
| Resin E | — | — | — | 70 |
| Acid content average value | 12.5 | 15.2 | 15.7 | 9 |
| Neutralizing agent (neutralization rate) | NaOH(54%) | KOH(30%) | KOH(30%) | KOH(30%) |
| Production method | Autoclave | Autoclave | Autoclave | Extrusion phase inversion |
| Charged resin | Melt blend | Melt blend | Melt blend | Single |
| Nv (%) | 35 | 42 | 42 | 37 |
| Viscosity (mPa · s) | 400 | 200 | 300 | 300 |
| Particle diameter (μm) | 0.5 | 0.5 | 0.5 | 0.9 |

| | Aqueous dispersion 5 | Aqueous dispersion 6 | Aqueous dispersion 7 |
|---|---|---|---|
| Resin A | 100 | — | — |
| Resin B | — | 100 | — |
| Resin C | — | — | 100 |
| Resin D | — | — | — |
| Resin E | — | — | — |
| Acid content average value | 20.5 | 15 | 10 |
| Neutralizing agent (neutralization rate) | KOH(20%) | NaOH(54%) | NaOH(80%) |
| Production method | Autoclave | Autoclave | Autoclave |
| Charged resin | Single | Single | Single |
| Nv (%) | 42 | 27 | 33 |
| Viscosity (mPa · s) | 200 | 500 | 900 |
| Particle diameter (μm) | 0.3 | 0.02 | 3.8 |

Nv: Nonvolatile content

Example 1

Base paper for a cup (basis weight: 170 g/m$^2$) manufactured by Tami Nadu Newsprint and Papers Limited was used as a substrate, and the aqueous dispersion 1 was coated twice using an air knife coater so that the amount of resin coated was 6 g/m$^2$, and dried at 130° C. for 20 seconds, thereby obtaining a paper coated article 1 as a laminate.

A soft aluminum foil (50 μm) was used as a substrate, and the aqueous dispersion 1 was coated once using a bar coater so that the amount of resin coated was 3 g/m$^2$, and dried at 120° C. for 20 seconds, thereby obtaining an aluminum foil 1 as a laminate.

(Cobb Value)

The Cobb value of the paper coated article 1 was measured by the Cobb method (JIS P8140) for the amount of water absorption after 300 seconds ($Cobb_{300}$), and evaluated according to the criteria described in Table 3. The results are shown in Table 4.

(Hot Water Resistance of Cup)

In a paper cup molded using the paper coated article 1, boiling water at 95° C. or higher was poured and left for 1 hour, and water leakage from the seal bonding portion was observed and evaluated according to the criteria described in Table 3. The results are shown in Table 4.

(Low-Temperature Adhesiveness)

The resin coated surfaces of the aluminum foil 1 were bonded to each other under the conditions of 110° C., 0.1 seconds, and 1 kg/cm$^2$, and the peeling strength was measured under the condition of a tensile speed of 50 mm/min and evaluated according to the criteria in Table 3. The results are shown in Table 4.

(Blocking Resistance)

The aluminum foil 1 was cut into squares of 5 cm in length and width, the coated surfaces were superimposed on each other, and the blocking resistance under the conditions of 45° C., 250 g/cm$^2$, and 24 hours was evaluated according to the criteria in Table 3. The results are shown in Table 4.

TABLE 3

| | S | A | B | C |
|---|---|---|---|---|
| Cobb value | Less than 5 g/m$^2$ | 5 g/m$^2$ or more and less than 10 g/m$^2$ | 10 g/m$^2$ or more and less than 15 g/m$^2$ | 15 g/m$^2$ or more |
| Hot water resistance of cup | — | No water leakage | Water leakage partially occurs | Water leakage occurs |
| Low-temperature adhesiveness | 500 g/15 mm or more | Less than 400 to 500 g/15 mm | Less than 300 to 400 g/15 mm | Less than 300 g/15 mm |
| Blocking resistance | None | Noise is slightly generated | Adhesion partially occurs | Adhesion entirely occurs |

TABLE 4

| | | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Paper coated article | Cobb value | S | S | S | S | S | B | C |
| | Hot water resistance of cup | A | A | A | A | B | A | A |
| | Blocking resistance | S | A | A | S | C | S | S |
| Aluminum foil | Low-temperature adhesiveness | A | S | S | A | S | B | C |
| | Blocking resistance | S | A | A | S | C | S | S |

Examples 2 to 4

Paper coated articles 2 to 4 and aluminum foils 2 to 4 were obtained in the same manner as in Example 1, except that each of the aqueous dispersions 2 to 4 was used instead of the aqueous dispersion 1 in Example 1. Each physical property of Examples 2 to 4 was evaluated in the same manner as in Example 1, using the obtained paper coated articles and aluminum foils. The results are shown in Table 4.

Comparative Examples 1 to 3

Paper coated articles 5 to 7 and aluminum foils 5 to 7 were obtained in the same manner as in Example 1, except that each of the aqueous dispersions 5 to 7 was used instead of the aqueous dispersion 1 in Example 1. Each physical property of Comparative Examples 1 to 3 was evaluated in the same manner as in Example 1, using the obtained paper coated articles and aluminum foils. The results are shown in Table 4.

[Measurement Method]

(Acid Content Average Value)

The acid content was measured by subjecting the resin to a base removal treatment, then melting the resin in tetrahydrofuran with heating, and titrating the resin with potassium hydroxide of a specified concentration in a heated state, and the acid content average value was calculated.

(Neutralization Rate)

The infrared absorption spectrum of the sample is measured, and a peak height "a" of absorption at 1700 cm$^{-1}$ corresponding to the carboxy group is determined. The peak height "a" corresponds to the number of carboxy groups that are not ionically bonded in the resin.

The sample is brought into contact with hydrochloric acid to remove metal ions in the resin (demetallization), thereby obtaining an acid copolymer having no ionic bond (intramolecular crosslinking). The infrared absorption spectrum of the sample of this acid copolymer is measured, and a peak height "b" of absorption at 1700 cm$^{-1}$ is determined. The peak height "b" corresponds to the number of all carboxy groups in the resin.

The neutralization rate (%) was calculated from the obtained peak heights "a" and "b" by the following formula.

$$\text{Neutralization rate (\%)}=100(1-a/b)$$

(Viscosity)

The viscosity was measured at 25° C. using a B-type viscometer (manufactured by Toki Sangyo Co., Ltd.).

(Particle Diameter)

The average particle diameter of the resin particles was measured by Nanotrac Wave II (MicrotracBEL Corp.).

(Melt Flow Rate)

The melt flow rate (MFR) was measured according to ASTM D1238-65T under the conditions of 190° C. and a load of 2.16 kg.

The invention claimed is:

1. A laminate comprising:

a substrate; and an adhesive layer laminated on at least one surface of the substrate, wherein the adhesive layer is obtained by drying a coated product of an aqueous dispersion containing water and a resin (X), the resin (X) contains two or more kinds of ethylene-unsaturated carboxylic acid copolymers (a) each having a different average content of a structural unit derived from an unsaturated carboxylic acid, the two or more kinds of ethylene-unsaturated carboxylic acid copolymers (a) include two or more kinds of an ethylene-unsaturated carboxylic acid copolymer (a1) having an average content of a structural unit derived from an unsaturated carboxylic acid of 12 mass % or more and 30 mass % or less, and one or more kinds of an ethylene-unsaturated carboxylic acid copolymer (a2) having an average content of a structural unit derived from an unsaturated carboxylic acid of more than 0 mass % and less than 12 mass %, as the ethylene-unsaturated carboxylic acid copolymer (a1), an ethylene-unsaturated carboxylic acid copolymer (a1-1) having an average content of a structural unit derived from an unsaturated carboxylic acid of 17 mass % or more and 30 mass % or less, and an ethylene-unsaturated carboxylic acid copolymer (a1-2) having an average content of a structural unit derived from an unsaturated carboxylic acid of 12 mass % or more and less than 17 mass % are included, and the content of the ethylene-unsaturated carboxylic acid copolymer (a1-1) is 20 mass % or more, the content of the ethylene-unsaturated carboxylic acid copolymer (a1-2) is 10 mass % or more, and the content of the ethylene-unsaturated carboxylic acid copolymer (a2) is 20 mass % or more based on the total amount of the ethylene-unsaturated carboxylic acid copolymers (a) contained in the resin (X), the total content of the ethylene-unsaturated carboxylic acid copolymer (a1-1), the ethylene-unsaturated carboxylic acid copolymer (a1-2), and the ethylene-unsaturated carboxylic acid copolymer (a2) is 100 mass %.

2. The laminate according to claim 1, in which the total content of the structural units derived from an unsaturated carboxylic acid included in the two or more kinds of ethylene-unsaturated carboxylic acid copolymers (a) is 5 mass % or more and less than 18 mass % based on the total amount of structural units derived from monomers of the polymer contained in the resin (X).

3. A laminate comprising:

a substrate; and an adhesive layer laminated on at least one surface of the substrate, wherein the adhesive layer contains two or more kinds of ethylene-unsaturated carboxylic acid copolymers (a) each having a different average content of a structural unit derived from an unsaturated carboxylic acid, the two or more kinds of ethylene-unsaturated carboxylic acid copolymers (a) include two or more kinds of an ethylene-unsaturated carboxylic acid copolymer (a1) having an average content of a structural unit derived from an unsaturated carboxylic acid of 12 mass % or more and 30 mass % or less, and one or more kinds of an ethylene-unsaturated carboxylic acid copolymer (a2) having a content of an average structural unit derived from an unsaturated carboxylic acid of more than 0 mass % and less than 12 mass %, as the ethylene-unsaturated carboxylic acid copolymer (a1), an ethylene-unsaturated carboxylic acid copolymer (a1-1) having an average content of a structural unit derived from an unsaturated carboxylic acid of 17 mass % or more and 30 mass % or less, and an ethylene-unsaturated carboxylic acid copolymer (a1-2) having an average content of a structural unit derived from an unsaturated carboxylic acid of 12 mass % or more and less than 17 mass % are included, and the content of the ethylene-unsaturated carboxylic acid copolymer (a1-1) is 20 mass % or more based on the total amount of the ethylene-unsaturated carboxylic acid copolymers (a) contained in the resin (X).

* * * * *